US009652123B2

(12) United States Patent
Lopez

(10) Patent No.: US 9,652,123 B2
(45) Date of Patent: *May 16, 2017

(54) TECHNIQUE FOR ENABLING MULTIPLE ACTIONS TO BE PERFORMED ON AN ACTIVE DATA ITEM

(71) Applicant: QUALCOMM Incorporated, San Diego, CA (US)

(72) Inventor: James Lopez, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/627,926

(22) Filed: Feb. 20, 2015

(65) Prior Publication Data

US 2015/0160803 A1 Jun. 11, 2015

Related U.S. Application Data

(63) Continuation of application No. 11/768,694, filed on Jun. 26, 2007, now Pat. No. 8,966,079.

(51) Int. Cl.
*G06F 3/048* (2013.01)
*G06F 3/0482* (2013.01)
*G06F 3/0489* (2013.01)
*G06F 9/44* (2006.01)
*H04M 1/725* (2006.01)

(52) U.S. Cl.
CPC ............ *G06F 3/0482* (2013.01); *G06F 3/048* (2013.01); *G06F 3/04892* (2013.01); *G06F 9/4443* (2013.01); *H04M 1/72552* (2013.01)

(58) Field of Classification Search
CPC .... G06F 3/0482; G06F 3/048; G06F 3/04892; G06F 9/4443; H04M 1/72552
See application file for complete search history.

(56) References Cited

U.S. PATENT DOCUMENTS

| | | | |
|---|---|---|---|
| 3,911,215 A | 10/1975 | Hurst et al. | |
| 5,854,629 A * | 12/1998 | Redpath | G06F 3/0482 715/830 |
| 6,029,192 A | 2/2000 | Hill et al. | |
| 6,493,006 B1 | 12/2002 | Gourdol et al. | |
| 6,870,828 B1 * | 3/2005 | Giordano, III | H04M 1/2478 370/352 |
| 7,016,084 B2 | 3/2006 | Tsai | |
| 2002/0128047 A1 | 9/2002 | Gates | |
| 2002/0184315 A1 * | 12/2002 | Earnest | H04L 51/12 709/206 |

(Continued)

OTHER PUBLICATIONS

International Search Report and Written Opinion of the International Searching Authority ISA/US for International Application PCT/US08/68050, filed Jun. 24, 2008, (PALM.1018WO) mailed Sep. 25, 2008, 11 pages.

*Primary Examiner* — Thai Nguyen
(74) *Attorney, Agent, or Firm* — Paradice and Li LLP

(57) ABSTRACT

A record is processed, and a determination is made as to whether a data item in the record is usable by any one of a plurality of applications that are operable on the device. The detected data item is made actionable by assigning multiple actions to the data item, so that each action is programmatically initiated responsive to a designated input.

41 Claims, 5 Drawing Sheets

(56) References Cited

U.S. PATENT DOCUMENTS

| | | | |
|---|---|---|---|
| 2003/0148790 A1* | 8/2003 | Pappalardo | H04M 1/274525 455/558 |
| 2005/0262435 A1* | 11/2005 | Ramanujan | G06F 9/543 715/234 |
| 2006/0271619 A1* | 11/2006 | Nurminen | G06Q 10/107 709/203 |
| 2008/0086640 A1 | 4/2008 | Voss et al. | |
| 2009/0006400 A1 | 1/2009 | Lopez | |
| 2015/0160802 A1 | 6/2015 | Lopez | |

* cited by examiner

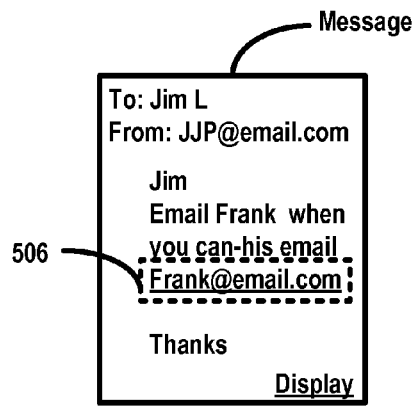
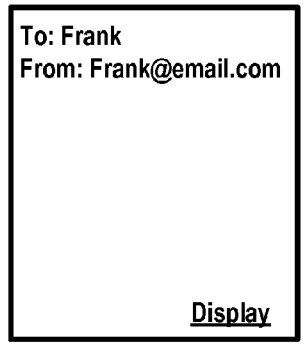
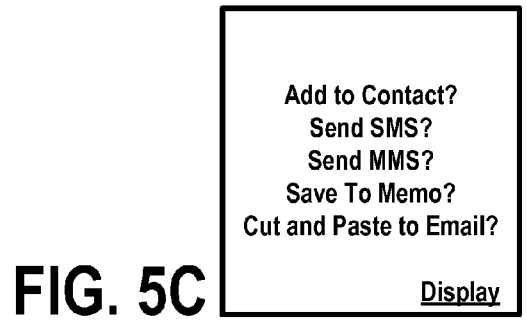
FIG. 5A
FIG. 5B
FIG. 5C
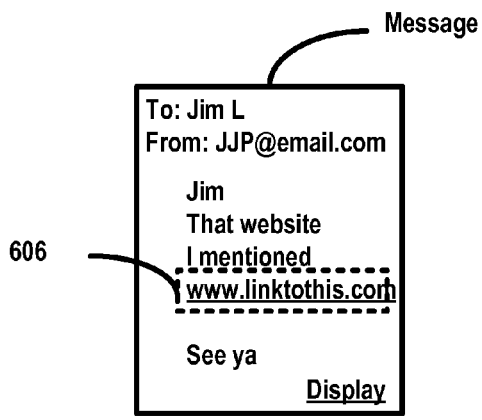
FIG. 6A
FIG. 6B
FIG. 6C

TECHNIQUE FOR ENABLING MULTIPLE ACTIONS TO BE PERFORMED ON AN ACTIVE DATA ITEM

CROSS-REFERENCE TO RELATED APPLICATIONS

This application is a continuation of co-pending and commonly owned U.S. patent application Ser. No. 11/768,694, filed Jun. 26, 2007, entitled "Technique for Enabling Multiple Actions to be Performed on an Active Data Item", the entirety of which is hereby incorporated by reference herein.

TECHNICAL FIELD

The disclosed embodiments relate generally to the field of computer-implemented functionality and user-interface features.

BACKGROUND

Computing devices, particularly handheld and portable devices, have evolved to include numerous types of communication capabilities and functionality. For example, handheld devices exist that operate as cellular phones, messaging terminals, Internet devices, while including personal information management (PIM) software and photo-management applications. Additionally, Internet Protocol services exist that can transform Internet-enabled machines into telephony devices. Even stand-alone telephones that connect to traditional Public Switched Telephone Networks (PSTN) are including more software to enhance the telephone's functionality.

In enhancing communication capabilities and functionality, effort has been made to enhance and assist the user in using such devices. For example, software features exist to facilitate the ease in which the user can act on a phone number in an email message. A sequence of phone numbers can be presented to a user for selection, and upon such selection being made, a telephony application uses the phone number in making a phone call. Small form-factor computing devices, such as devices that provide cellular phone functionality, have particular use for such short-cut functionality, in order to reduce the manual involvement of the user. These devices have smaller keyboards that may be harder to operate, and/or use in mobile or dynamic environments, where the user cannot readily retrieve a desired number.

Telephony devices are just one type of communication device. There are now many types of communication types, and multi-functional devices exist to accommodate the different communication types. Examples of communication types other than telephony include email, instant message (including SMS protocol messages and Multimedia Message Service (MMS) protocol messages), and video conferencing. Many computing devices, particularly smart phones, are enabled to support communications using multiple communication mediums.

BRIEF DESCRIPTION OF THE DRAWINGS

FIG. 5A-5C illustrates alternative programmatic actions that may be made actionable on a detected data item that is in the form of a messaging identifier such as an email address, according to one or more embodiments of the invention.

FIG. 6A-6C illustrates alternative programmatic actions that may be made actionable on a detected data item that is in the form of a URL or web link, according to one or more embodiments of the invention.

DETAILED DESCRIPTION

Figure 1:
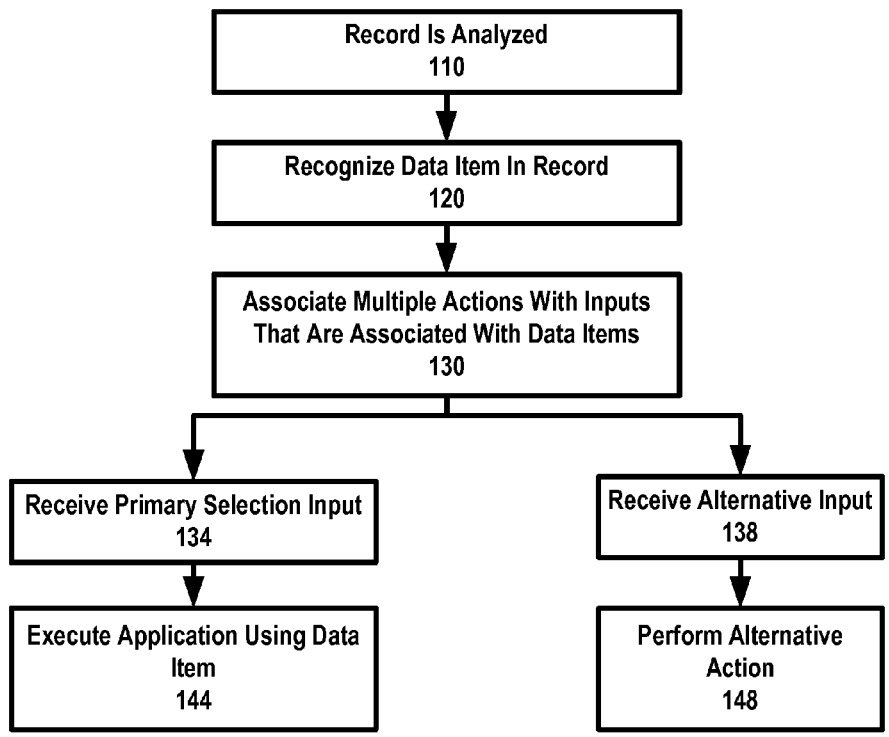
FIG. 1 illustrates a computer implemented method for identifying and using actionable data items, according to one or more embodiments of the invention.

Embodiments described herein enable multiple programmatic actions to be performed on data items that are detected from records and documents. Such data items may correspond to e-mails and other messaging identifiers, phone numbers, and web links such as URLs.

According to one or more embodiments, a computer is configured to be capable of detecting multiple types of data items. Furthermore, the programmatic actions that are enabled with each data item may be pertinent to the type of data item. For example, different programmatic actions may be performed and/or enabled for selection to the user when the data item is phone number, as opposed to an email address.

One or more embodiments described herein enable the performance of user-actions on data items that are contained in records or documents that are rendered or used on a computing device. In one embodiment, a record is processed, and a determination is made as to whether a data item in the record is usable by any one of a plurality of applications that are operable on the device. The detected data item is made actionable by assigning multiple actions to the data item, so that each action is programmatically initiated responsive to a designated input.

In another embodiment, a determination is made as to whether a data item contained in a record is of a particular data item type. The data item made be provided in an active state. Each of two or more designated inputs may be made by a user in association with the data item in the active state, so that either of two or more programmatic actions may be initiated or subsequently for the data item in the active state.

In another embodiment, a computing device includes one or more processors that are configured to recognize a data item in a record or document as being one of two or more types of data items, and provide the data item in the record or document in an active state. Multiple programmatic actions may be associated with the data item of each data item type. The programmatic actions that are enabled for the data item of each data item type are selected so as to be pertinent to that data item type. Each of the programmatic actions may be performed or initiated with a corresponding designated input.

In another embodiment, a computing device includes one or more processors that are configured to make a determination that a data item contained in a record is of a particular data item type. The one or more processors provide the data item in an active state, so that the data item may be programmatically acted on by the user with entry of a designated input. Each of two or more programmatic actions may be performed using the data item in the active state, responsive to a designated input entered by the user.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using modules. A module may include a program, a subroutine, a portion of a program, or a software component or a hardware component capable of performing one or more stated tasks or functions. As used herein, a module can exist on a hardware component independently of other modules, or a module can be a shared element or process of other modules, programs or machines.

Furthermore, one or more embodiments described herein may be implemented through the use of instructions that are executable by one or more processors. These instructions may be carried on a non-transitory computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

FIG. 1 illustrates a computer implemented method for identifying and using actionable data items, according to one or more embodiments of the invention. And method such as described may be performed in any computing environment, including on a desktop computer or small form factor device. In particular, one or more embodiments contemplate implementation of a method such as described on a mobile computing device, including cellular voice/data devices for enabling telephony and messaging.

In a step 110, a document or record is analyzed for presence of one or more types of data items. In an embodiment, the record may correspond to a message, such as an email message, SMS message, MMS message, or instant message. Alternatively, the record may correspond to a record from a personal information management database or store, such as a contact record or a task. An analysis such as described may also be performed on a document (e.g. word processing document or spreadsheet) or any other medium on which a data item may be recognized.

In one embodiment, the analysis includes scanning text for the presence of markers that indicate a particular kind of data item. Multiple kinds of data items may be sought. In one implementation, the data items correspond to a sequence of characters that signify a phone number, a messaging identifier or address (e.g. email address), or a URL or link to a network site or location. Other implementations may detect data items that correspond to, for example, pin codes or conference call-in numbers and session identifiers. Numerous other kinds of data items may also be sought, such as, for example, images (e.g. a picture contained in an MMS message) or embedded objects of the document or record.

In one embodiment, text from the document or record is scanned for markers that are indicative of a particular kind of data item. For phone numbers, for example, markers may include (i) a string of numbers that is greater than or equal to seven in size; and/or (ii) a string of numbers that follow a set of three numbers in parenthesis (e.g. "(408)"). A marker for an email address may be identified by the presence of a character such as "@", while a messaging identifier for a telephony application such as SMS may be signified by any phone number or sequence of numbers that is greater than a minimum number in length (e.g. four). A URL to a website may be identified by the presence of ".com" or other domain identifier. Numerous other techniques for identifying specific kinds of data items may also be employed.

In step 120, the recognized data item from step 110 is provided in an active state. In the active state, the data item may be displayed in a manner that indicates the data item is actionable. When actionable, the user may enter a short input (e.g. selection input, double-click etc.) to cause some programmatic action to be performed with use of the active data item. The data item in the active state may be displayed, for example, as a link.

Step 130 provides the multiple programmatic actions to be associated with the data item in the active state. Step 130 may be performed concurrently or even before step 120. Each of the programmatic actions that are associated or assigned to the data item in the active state may be triggered by an input that is separate and/or distinguishable to that action. In this way, recognized data items from step 110 may be actionable in multiple ways, through different inputs.

One more ore embodiments provide that two or more programmatic actions may be performed on a data item that is in an active state, where each programmatic action is triggerable or responsive to a particular designated input. The designated inputs may correspond to different kinds of quick or short-cut actions, such as provided by a mechanism being actuated (e.g. button press, screen tap, mouse-click, scrolling). In one embodiment, at least one of the designated inputs for one of the programmatic actions of the data item is a selection input, made through actuation of a mechanism that indicates a selection action by the user. Other kinds of selection input or interaction may be assigned for the other designated input. For example, in one embodiment, a partial selection input or interaction may be assigned to the other designated input.

The designated inputs may alternatively be distinguishable by scrolling activity. For example, all of the multiple actions that are enabled for an active data item may be displayed at one time. The user may select a particular action by scrolling a menu that displays the available actions, and selecting one of the desired actions.

An embodiment provides that, for a given data item, one of two or more designated inputs may be received in association with the data item being in the activated state. Step 134 assumes a first designated input is entered by the user in association with a particular data item being in the active state. In one implementation, the link of the data item is selected with a selection input from the user. For example, the user may operate to place the link of the data item in a selected state, through use of an input mechanism that signifies selection. The first designated input of step 134, when performed in association the data item being in the active state, triggers the assigned programmatic action for that input in step 144. For example, when the data item is the phone number, the assigned programmatic action may correspond to one of (i) enabling or prompting the user in selecting the phone application to make a call using the phone number, or (ii) automatically causing the phone application to make the call using the phone number.

As an alternative to step 134, step 138 assumes a second designated input is entered by the user in association with the particular data item being in the active state. Thus, under one embodiment, the user enters either the first designated input or the second designated input. In one implementation, the link of the data item is selected with an alternative selection input being used as the second designated input. The second designated input may distinguishable from the first designated input by use of a separate input mechanism (i.e. a different button), different input action (e.g. left-click versus right-click), and/or through use of scrolling activity. Still further, the second designated input may correspond to a user-interaction in which the data item is placed in a partial active state. Such a partial active state may correspond to the data item being highlighted, or placed "in focus".

The second designated input of step 138, when performed in association the data item being in the active state, triggers the assigned programmatic action for that input in step 148. For example, when the data item is the phone number, the assigned programmatic action may correspond to one of (i) enabling or prompting the user in selecting anyone of a plurality of actions, such as saving the phone number to a contact record; or (ii) automatically initiating the alternative action (e.g. copying the phone number and presenting a lookup field for the contact records or other PIM database).

Figure 2:
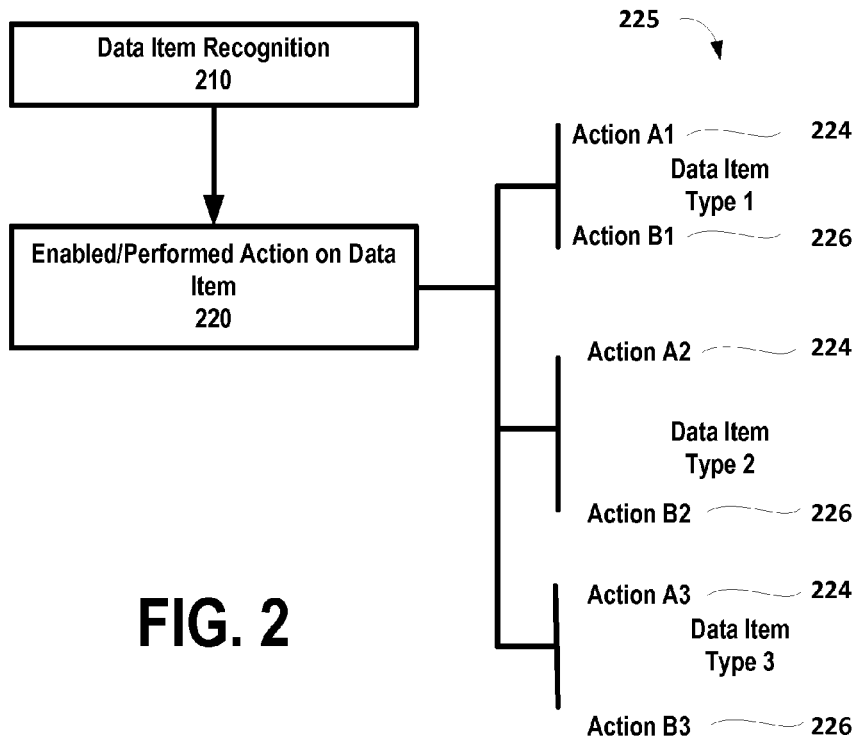
FIG. 2 illustrates a process flow in which actions that are enabled in connection with a data item in active state are pertinent to the type of the data item.

According to an embodiment, a method such as described by FIG. 1 may be used to detect multiple types of data items from a given record or document. Moreover, one or more embodiments provide that each data item, when in the active state, is associated with programmatic actions that are pertinent, or alternatively most pertinent, for the type of data item. FIG. 2 illustrates a process flow in which actions that are enabled in connection with a data item being placed in an active state are pertinent to the type of the data item. Steps such as described with FIG. 2 may be performed as part of steps 110 thru 130 of an embodiment of FIG. 1.

In step 210, a data item is recognized. The data item may be of a given type, and the recognition mechanism may be capable of recognizing more than one type of data item. For example, step 110 may be performed by a device that is configured to be capable of recognizing phone numbers, alphanumeric text message identifiers, email addresses, and/or web links (e.g. URLs).

Step 220 provides that different programmatic actions are enabled for data items of different types. The programmatic actions that are enabled for each data item type may be different in that each type of data item is enabled for actions that are pertinent to the applications and programs that can use the particular data item type. Thus, under an embodiment, only actions that are pertinent to the type of data item may be performed or enabled.

Step 220 illustrates possible recognition of three different types of data items 222. Each data item of a particular type 222 may have (when in the active state) a particular set or class of programmatic actions assigned to it. Step 220 illustrates an implementation where there are two types of programmatic actions 225 for the data item of each type. While an embodiment of FIG. 2 illustrates that the data item of each type has multiple actions, an embodiment may provide that some data items have only a single action.

Under one implementation, the programmatic actions 225 may be identified as primary actions 224 or alternative actions 226. The primary action may correspond to enabling or automatically executing an application that has a primary use for the particular kind of data item. For example, a phone application on a mobile computing device has a primary use for a phone number, even though other applications can make use of a phone number. Continuing the example of the phone number, the alternative actions may correspond to, for example, sending text messages to a phone number, or saving the phone number in a contact record or memo record. As with the primary action, the alternative actions may be enabled and performed with subsequent input (i.e. selection input) rather than automatically performed with entry of one designated input. One or more embodiments provide for multiple alternative actions to be enabled and/or automatically performed for some or all types of data items.

Furthermore, as mentioned, some or all of the programmatic actions may be prompts to enable the user to readily select the primary action 224 or one of the alternative actions 226. For example, as described elsewhere, the user may enter a designated input for the alternative actions 226, and then be presented a menu of selectable options. Likewise, the user may enter the designated input for the primary action, and be presented with a prompt that asks whether he or she wishes to complete the action.

As mentioned, each of the primary or alternative/additional actions may be pertinent to the type of the data item. The primary action for a phone number, for example, may be to place a call, while the primary action for an email may be to compose a message to the email address that is the data item. Actions that are not pertinent to the type of the data item may be excluded as an option that is or can be performed in connection with the active data item.

Moreover, any of the actions described may be enabled in that they are performed automatically upon a first in time designated input being detected, or in the context that a designated input presents the user with an opportunity to select and/or provide additional input to have one or more other actions performed. Thus, actions described as being enabled with an embodiment of FIG. 2 may be short-cut actions, albeit not necessarily performed automatically or responsively to a designated input.

Figure 3:
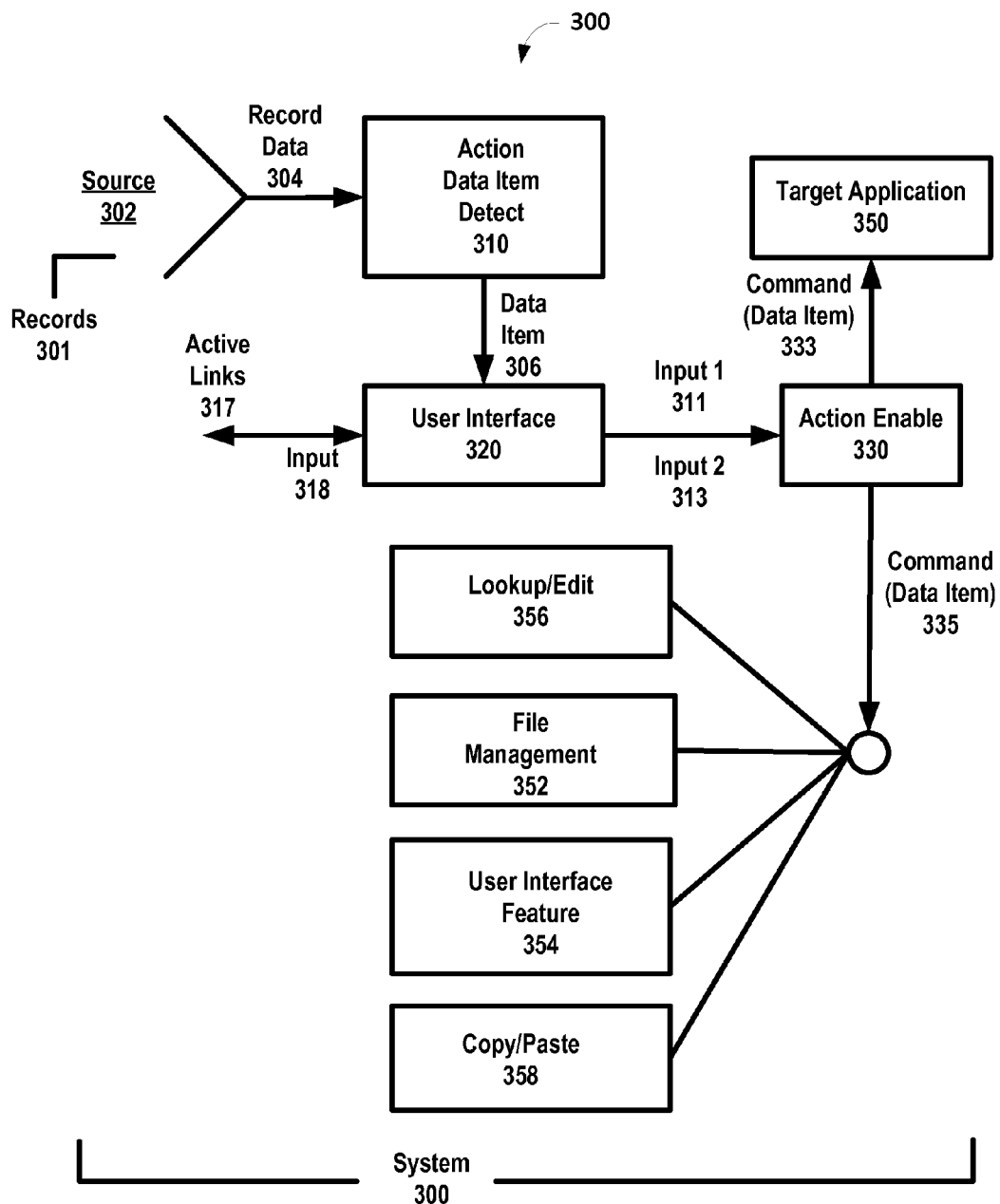
FIG. 3 illustrates a system for identifying and using actionable data items, according to one or more embodiments of the invention.

FIG. 3 illustrates a system for identifying and using actionable data items, according to one or more embodiments of the invention. A system such as described with an embodiment of FIG. 3 may be used to implement any of the methods and embodiments described with, for example, FIG. 1 or FIG. 2. Furthermore, a system of FIG. 3 may be implemented on any one of various computing environments, including a mobile computing device or fully-functional personal computer.

In an embodiment, a system 300 include modules in the form of a data item detect 310, a user-interface 320, and an action enable 330. The data item detect 310 may analyze record data 304 from a source 302 of records. The source 302 of records may correspond to a database or other data store, or alternatively any file or document that is received or handled on the computing device. For example, the source 302 may include messages maintained in association with a messaging program, such as an email program. Newly received messages or other records, or temporarily stored and used messages or records may also be used. More generally, one or more embodiments provide that records and documents maintained in a file folder system of a computing device may act as the source 302 for records.

The data item detect 310 may scan record data 304 from individual records 301 in the record source 302. The trigger or conditions for when the data item detect 310 processes record data 304 for a given record may vary. For example, text from an email message may be scanned on receipt by the computing device. As an alternative or addition, each time a record is opened, modified or created, the text (or newly added text) may be inspected in the data item detect 310. Still further, one or more embodiments provide that the data item detect 310 is manually initiated by a user. Once recognized, the data item 306 may be stored with the record or document as an actionable data item.

The data item detect 310 may inspect or analyze the record data 304 in making a determination as to whether a data item 306 of a particular type exists in a given record. As mentioned with one or more other embodiments, the data item of each particular type may be identified by markers, such as those that are indicative of phone numbers, email addresses, other messaging identifiers, and URLs or other links to network sites or locations. One or more embodiments provide that multiple types of data items may be detected (e.g. phone number, SMS identifier, email address).

According to an embodiment, an output of the data item detect 310 is the identification of data items 306. Each data item 306 may be provided in an active state, at least when the record or document containing the data item is in use. A data item in an active state may have the following characteristics: (i) when the record or document that contains the data item is opened, the data item is shown in some form that delineates it from other text or data; and (ii) the user is capable of interacting or providing one or more different inputs that is recognizable by the computing device for purpose of performing one or more programmatic actions.

In making data item 306 active, the user-interface 320 may display the recognized data item with some form of prominence. For example, the data item 306 may be displayed as a selectable link. The user may act on the link through one or more designated inputs. In this respect, the user-interface 320 may correspond to programming or other logic that coordinates and affects use of multiple types of user-interface features. The user-interface 320 may affect the manner that the data item 306 is displayed on a display surface or medium of a computing device. Likewise, the user-interface 320 may coordinate use of input features, such as multi-function mechanical features, buttons or the display (when contact-sensitive) to enable the user to specify one of the designated inputs 318 for the active data item, as well as enabling the user to provide a specific one of the designated inputs 318 in association with the data item 306 in the active state.

The programmatic actions assigned to the data item 306 in the active state may be provided and handled by the action enable 330. As described with an embodiment of FIG. 2, the programmatic action(s) that is/are enabled for the data item 306 may vary based on the data item type (e.g. email address, phone number or web link).

Additionally, the action enable 330 may recognize when one of the designated inputs 318 that are enabled by the user-interface 320 are provided by the user in association with the data item in the active state. According to one implementation, action enable 330 may detect and associate one of the designated inputs 318 to the data item 306 in the active state. The designated input 318 for a data item may vary (or not), in whole or in part, depending on the type of data item.

The user-interface 320 may include programming or other logic used with any one of many devices or components, such as buttons, multi-way interfaces and/or displays. The user-interface 320 may be configured to present recognized actionable data items as active links 317, and to recognize inputs that are meant to be associated on the data item. Among other functionality, the module of the user-interface 320 may be configured to provide the display menu of the user-interface feature 354.

As described with an embodiment of FIG. 1 or FIG. 2, the designated input 318 provided in association with the data item 306 in the active state may result in one of two or more programmatic actions being identified. The user-interface 320 may signal one of two or more inputs 311, 313 (e.g. selection versus in-focus) to the action enable 330, which then initiates or performs the subsequent programmatic actions. In an embodiment, the data item 306 may be enabled with two or more programmatic actions, where each programmatic action is associated with a particular input. The user-interface 320 detects the input provided, and the action enable 330 recognizes the designated input and performs the associated programmatic function.

As described with an embodiment of FIG. 2, one or more embodiments provide that a first designated input (when provided in association with the data item 306 being in the active state) triggers either (i) performance of a primary application action using the data item 306, or (ii) enables the user to enter selection input or otherwise confirm to have the primary application action performed. In the latter case, the action may be a short-cut, so that the amount of effort required from the user is far less than would otherwise be required (e.g. single button press versus manually entering each number of a phone number). A second designated input (when provided in association with the data item 306 being in the active state) triggers either (i) performance of an additional action using the data item 306, or (ii) enables the user to enter selection input to have one of one or more additional actions to be performed. In the latter case, for example, the user may be displayed a menu.

In an embodiment, the action enable 330 may perform the triggered actions in response to either of the designated inputs. For when the primary application action is signaled by the designated input, the triggered actions may correspond to (i) automatically sending a command 333 to the targeted application 350 or programming element to use the active data item 306, or (ii) prompt the user to enter selection or other short-cut input to have the designated application 350 or programming element use the active data item 306. For when the additional or alternative application action is signaled by the other of the designated inputs, the triggered actions may correspond to (i) automatically sending a command 335 to a designated alternative application or programming element to use the active data item 306, (ii) prompt the user to enter selection or other short-cut action to have the designated alternative or additional application or programming element use the active data item 306. In the latter case, user-interface 320 may provide a menu of actions that can be performed using the data item may be displayed to the user for selection.

As illustrated by an embodiment of FIG. 3, the alternative application or programming elements may correspond to one or more of: (i) a file management program or routine 352 for maintaining documents, records or data items for use by a user and/or an application; (ii) a lookup or editing interface 356 for enabling search of a database or data store of records; (iii) a copy and paste feature 358; and/or (iv) a user-interface feature 354 for displaying or otherwise generating a feature for enabling user-interaction to select or configure programmatic actions on the data item 306 (e.g. for providing any or all of the programmatic actions described with (i)-(iii)). The alternative application or programming elements shown and described are only examples of implementations that can be provided with one or more embodiments.

In more detail, the file management program 352 may be used to initiate a save routine that stores a copy of the record at a designated file location. In one implementation, the location of where the data item is to be saved is pre-selected. In particular, the target file folder for where the data item is to be saved may be pre-selected, based at least in part on the type of the data item. Thus, the alternative designated input may cause the action enable 330 to perform at least some of the steps in the sequence of saving the data item automatically. These steps may include pre-selection of the file folder where the data item to be stored. For example, the alternative designated input may facilitate the user in performing a short-cut action to save a URL in a favorite folder of the browser application. The location of the favorite folder may be pre-selected for the user, but also subject to change based on user-input.

Under one implementation, the lookup or editing interface 356 may correspond to an application or application plug-in that searches a database or data store of records. As an example, a contact record database may include a feature to enable a lookup of a person by first name, last name, initial, or other contact record field. The lookup or editing interface 356 may enable the user to insert the data item into a selected field of the record after lookup, so as to enable the user to edit the identified record. Additionally, the lookup or editing interface 356 may enable the user to create a new record with the data item 306 carried over into a designated or selected field of the record. Insertion of the data item 306 may involve copy and paste functionality 358.

The copy and paste functionality 358 may be used in connection with other tasks or programming acts. In addition to an example such as recited above, in which the data item is inserted into a designated or selected field, the copy and paste functionality 358 may be carried out with any one of many other programming acts or tasks. For example, in the case when the data item 306 corresponds to an email address, the copy and paste functionality 358 may be used to copy and paste the email address into the compose field of an email, a contact record, or a electronic memo. In the case where the data item 306 corresponds to a link or a URL, the copy and paste function may copy and paste the URL to a browser bar, or into the body of an email for messaging to another person.

In one embodiment, the user-interface feature 354 may be provided in the form of a window or display that enables the user to manually specify or configure an action, and/or to select an action from many possible actions. For example, responsive to the alternative designated input being provided in association with the active data item 306, a menu of options may be presented that enable the user to select an action requiring use of the data item. As described with one or more other embodiments, the actions provided may be only those that are pertinent to the particular type of data item.

Implementation Illustrations

Figure 4A:
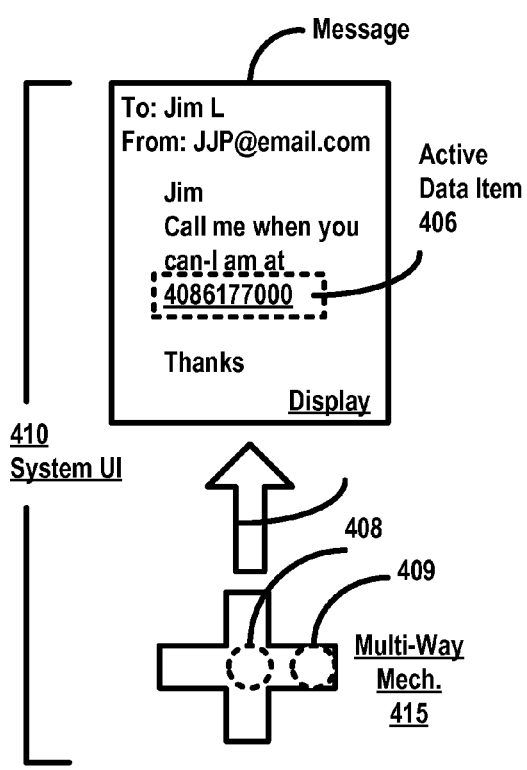
FIG. 4A-4C illustrates alternative programmatic actions that may be made actionable on a detected data item that is in the form of a phone number, according to one or more embodiments of the invention.
Figure 4B:
Figure 4C:
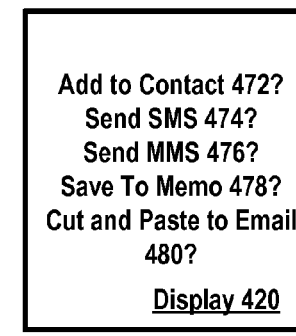

FIG. 4A-4C illustrates alternative programmatic actions that may be made actionable on a detected data item that is in the form of a phone number, according to one or more embodiments of the invention. An embodiment such as shown and described with FIG. 4A-4C may be implemented using a computing device or system such as shown with an embodiment of FIG. 3. In FIG. 4A, a system user-interface 410 is shown in abstraction, having as elements a display interface 420 and one or more mechanical or interactive user-interface features. In an example shown by FIG. 4A-4C, the record is an email message. The record data that is analyzed or scanned is text contained in the body of the email. Furthermore, in the implementation described, a data item 406 in the form of a phone number is recognized and made active. The data item 406 in the active state may be displayed as a link, or otherwise made distinguishable or placed in prominence so as to communicate functionality associated with it.

As described with one or more embodiments, the functionality provided with the data item 406 may be made available to the user in response to the user entering a designated input in association with the data item 406. Multiple actions may be assigned to the data item 406, and different inputs may be detected in order to enable or cause performance of those actions. In one embodiment, the different designated inputs may be made in association with the data item 406 through use of a mechanical input feature (or multiple features), as described below.

In an embodiment, a multi-way or functional mechanical feature 415 may be used in connection with the display interface 420 to enable the user to enter the designated inputs for the active data item 406. The multi-way mechanical feature 415 may correspond to a device that enables a user to scroll, navigate and select from one mechanical interface. For example, the multi-way mechanical feature 415 may correspond to a button set combination that enables a user to enter navigation input (e.g. in 2, 4 or more directions) and selection input.

In an embodiment, the multi-way mechanical input feature 415 may operate in conjunction with logic of the computing device that enables the user to navigate in hops from one object or feature on the display interface 420 to the next. A user may navigate to one data element to place the data element "in-focus". The state of being in-focus means that subsequent selection input would cause that particular data element (and not any other data element) to be acted upon by the selection input. The state of being in-focus is sometimes referred to as a partially-selected state. With object-to-object navigation, a user is able to (i) navigate in one or more directions to cause active elements appearing on the display interface 420 to be made in-focus, and (ii) navigation from one such element to another element may be made, without interruption from any intermediate object or display graphic. In the example provided by FIG. 4A, a user may navigate from a starting point such as the "To:" field to, for example, the "From" field and next to the phone number 406.

In one embodiment, one of the designated inputs may correspond to a selection input, which may be entered by, for example, the user pressing a center-select area 408 on the multi-way mechanical feature 415. The pressing of the center-select area 408 may invoke one of the programmatic actions (e.g. the primary action). The designated input(s) for invoking the additional or alternative functionality may correspond to other inputs that can be made through the multi-way mechanical feature 415. These may include, for example, press and hold in the center-select area 408, a double-click of the center-select area 408, directional input made through, for example, one of the directional areas 409, or navigating or placing the data item 406 in-focus for a designated period of time (e.g. one second).

As described above and elsewhere, one or more embodiments provide that the active data item 406 may be acted upon by the user with different designated inputs. Different programmatic actions may result from different designated inputs being entered by the user. FIG. 4B illustrates one result from the active data item 406 being acted upon with one designated input, under an embodiment of the invention. As a phone number, the active data item 406 may be pre-associated with programmatic actions that are pertinent to telephony. These programmatic actions may be enabled in connection with inputs that are acted on the data item 406. FIG. 4B illustrates the case where a primary programmatic action is performed automatically in response to a designated input (e.g. press of center-select area 408). A telephony application may execute and use the active data item 406 to place a phone call.

While an embodiment described above provides for the telephony application to automatically place the phone call using data item 406, one or more embodiments provide that the designated input results in the user being prompted with the option to have the phone call placed. For example, the user may be asked to confirm that he or she wishes to place a phone call. If the user enters an appropriate selection input, the telephony application may execute in the manner described.

FIG. 4C illustrates enablement or use of alternative programmatic actions that may result with the user entering corresponding designated inputs is association with the data item 406 in the active state, under an embodiment of the invention. The user may enter an alternative or additional input by which another programmatic action or set of programmatic actions is performed or made enabled for selection, in addition to the programmatic action shown in an embodiment of FIG. 4B. In FIG. 4C, an alternative or additional input results in the programmatic act of a menu being displayed, where the menu lists other programmatic actions that may be performed with selection input. The alternative or additional programmatic actions may correspond to any one or more or combination of the following: (i) a copy and paste function 472 for adding a phone number to a contact or other record; (ii) a first message compose function 474 (e.g. SMS) using the phone number in the address field; (iii) a second message compose function 476 (e.g. MMS) using the phone number in the address field; (iv) an alternative copy and past function 478, such as for saving the phone number to a memo; and/or (v) a third copy and past function 480, for entering the phone number into the body of an email. Numerous other functions may be displayed or performed in response to an alternative or additional input acted on the data item. In addition, any of the programmatic functions such as described with functions 472-480 may be performed automatically, without further user-input (other than responsive to the designated input entered by the user in association with the active data item), as an alternative to displaying the programmatic functions for selection and performance by the user.

As an addition or alternative to the multi-way mechanical feature 415, buttons, contact surfaces, members, pointers, touch pads and other mechanical features may also be used. As still another addition or alternative, the display interface 420 may be contact-sensitive, and the device may use virtual input mechanisms that simulate any of the mechanical features or inputs described herein.

As an alternative to an embodiment of FIG. 4A-FIG. 4C, in which different programmatic actions are performed in response to different designated inputs, one or more embodiments may provide for a single designated input (e.g. pressing of the center-select area 408) that enables the user to select from two or more different programmatic actions. For example, one designated input may invoke a menu containing multiple programmatic options. The user may scroll or navigate to a selected action, then select again (e.g. through pressing of the center-select area 408). In such an embodiment, the programmatic action shown by FIG. 4B may follow the programmatic action shown by FIG. 4A, and be responsive to the user selecting an action that corresponds to placing a phone call.

FIG. 5A-5C illustrates alternative programmatic actions that may be made actionable on a detected data item that is in the form of a messaging identifier such as an email address, according to one or more embodiments of the invention. An embodiment such as shown and described with FIG. 5A-5C may be implemented using a computing device or system such as shown with an embodiment of FIG. 3.

In an example shown by FIG. 5A-5C, an identified data item 506 is in the form of an email address. Once detected, the data item 506 may be made active. For example, the data item 506 may be displayed as a link. As described with FIG. 4A-4C, functionality provided with the data item 506 may be made available to the user in response to the user entering one or more designated inputs in association with the data item 506. Multiple actions may be associated or assigned to data item 506 upon data item 506 being recognized as an email address. In this way, the actions may be made pertinent to an email address. For example, the actions may correspond to legitimate uses of an email address. In one embodiment, different designated inputs may be used to act on the data item 506 in the active state.

In an embodiment, a multi-way or functional mechanical feature, such as shown and described with an embodiment of FIG. 4A-4C. may be used to enable the user to specify what action or actions are to performed on the data item in the active state. Thus, for example, the user may use a combination navigation/selection mechanism, and enter different button presses to select and/or navigate and/or place the active data item 506 in-focus. According to an embodiment, different inputs provided in association with the active data item 506 may enable or result in the performance of different programmatic actions. The different designated inputs may individually correspond to any of the inputs provided or used with other embodiments described herein.

As an email address, the active data item 506 may be pre-associated with programmatic actions that are pertinent to messaging. These programmatic actions may be enabled in connection with inputs that are acted on the data item 506. FIG. 5B illustrates the case where a primary programmatic action is performed automatically in response to a designated input, such as a selection input. In one implementation, an email application may execute and use the active data item 506 to partially compose a new message, such as by inserting the email address in an appropriate address field of a newly created email message. The execution of the email application in this manner may be performed automatically in response to a specific input, or may be performed after the user is prompted to confirm his or her desire to have the action performed.

FIG. 5C shows that alternative or additional designated inputs may result in the user being provided a menu of actions that can be performed on the active data item 506. These alternative actions may correspond to, for example, some or all of the programmatic actions described with FIG.

4A for the case of a phone item. The programmatic actions may also be configured in some way that is specific to the type of the data item 506. For example, when the user seeks to add an email address to a contact record, the corresponding programmatic action may identify an email field of the contact record, and insert the email address in the appropriate field. Actions that are specific to email addresses may also be used, such as (i) adding the email address to a white list for incoming email, where the white list represents an approved list of email senders; and (ii) assigning or copying emails that are from the particular email address to a specific email folder.

FIG. 6A-6C illustrates alternative programmatic actions that may be made actionable on a detected data item that is in the form of a URL or web link, according to one or more embodiments of the invention. An embodiment such as shown and described with FIG. 6A-6C may be implemented using a computing device or system such as shown with an embodiment of FIG. 3.

According to an embodiment, an identified data item 606 is in the form of a URL or link. The data item 506 may be active, in that it is selectable and displayed as being selectable (e.g. with an underline). Multiple actions may be associated or assigned to data item 606, and the actions may be specific to the data item 606 being a URL or web link. In one embodiment, different designated inputs may be used to perform different actions on the data item 606 when in the active state.

In an embodiment, a multi-way or functional mechanical feature, such as shown and described with an embodiment of FIG. 4A-4C, may be used to enable the user to specify what action or actions are to performed on the data item 606. According to an embodiment, different inputs provided in association with the active data item 606 may enable or result in the performance of different programmatic actions. The different designated inputs may individually correspond to any of the inputs provided or used with other embodiments described herein.

FIG. 6B illustrates the case where a primary programmatic action pre-associated with the link 606 is performed automatically in response to a designated input, such as a selection input. This action may be to trigger a browser component to use the link to access a file from a network location identified by the link.

FIG. 6C shows that alternative or additional designated inputs may result in the user being provided a menu of actions that can be performed on the active data item 606. These alternative actions may correspond to, for example, one or more of the following: (i) an action 652 of emailing the link to a particular correspondent, in which case an email composition to a desired person may be initiated; (ii) an action 654 of sending the link via SMS (or other messaging transport) to a desired person; (iii) an action 656 of saving the link to a record, such as a memo record; and (iv) an action 658 of saving the link as a favorite or otherwise book-marking it.

Hardware Diagram

Figure 7:
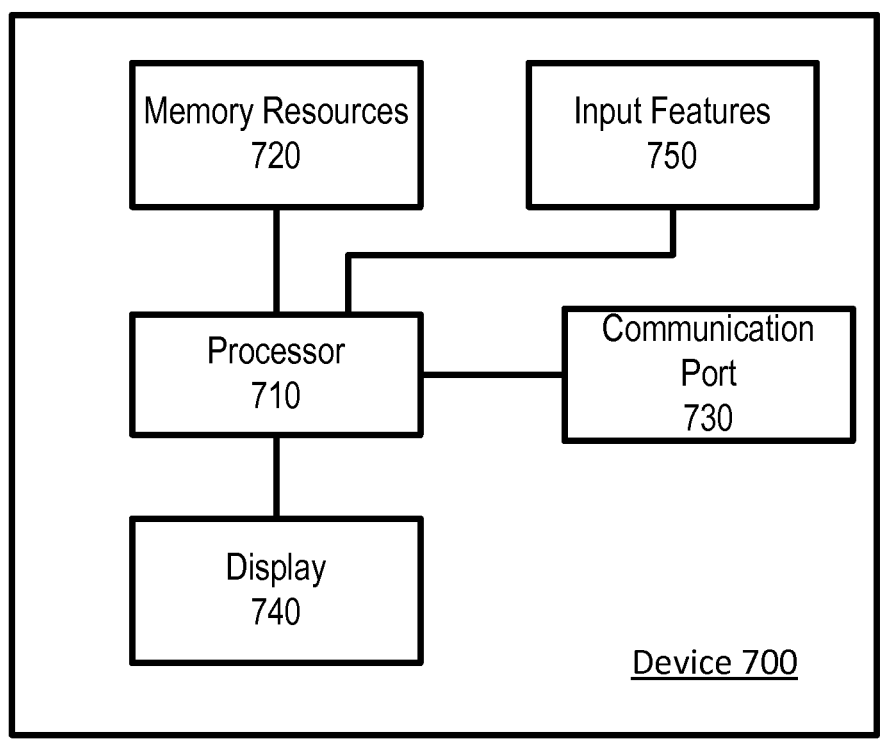
FIG. 7 is a simplified hardware diagram for implementing any embodiment or combination of embodiments such as shown and described above.

FIG. 7 is a simplified hardware diagram for implementing any embodiment or combination of embodiments such as shown and described above. A device 700 includes one or more processors 710, memory resources 720, a communication port 730, a display 740, and one or more mechanical input features 750. In an embodiment, the device 700 corresponds to a cellular telephony device, such as a smart phone or mobile manager, capable of cellular telephony, messaging, and data exchange. Alternatively, the device 700 may be any kind of computing device, such as a laptop computer, light computing device, or desktop computer.

The communication port 730 may be configured to provide wireless connectivity of a particular type (or types). For example, the communication port 730 may correspond to a WAN radio module for sending and receiving cellular voice/data, a local wireless communication port such as Bluetooth or wireless USB, an infrared port, a Global Positioning System radio, or a WiMAX radio.

The memory resources 720 may include Flash memory, Random Access Memory, and/or persistent memory (i.e. ROM). The memory resources 720 include instructions and data for implementing functionality and programmatic actions such as provided with any of the embodiments described. Additionally, the memory resources 720 may carry databases or data stores of records that contain active data items (such as described above), and/or enable actions on such data items of saving the data items. The display 740 may render the data items described with any embodiment herein in an active state (e.g. as a link). The mechanical input mechanisms 750, which may include buttons or multi-way interface features, may enable navigation, selection, and/or in-focus or partial input selection. Such inputs may correspond to designated inputs which may be associated with active data items, and thus enable or cause programmatic actions associated with such data items. In other variations, mechanical interface features include touch-sensitive pads (e.g. capacitive or resistive), dials, joy-sticks and multi-directional members, roller balls, bezels or other forms of input mechanisms.

Additionally, under one variation, the display may be contact-sensitive (or alternatively light-sensitive) and thus enable interaction with the user. Such interactions may be used to provide any of the designated inputs for causing or enabling programmatic actions such as described.

As an alternative or addition to any embodiment in which a mechanical interface or input mechanism is recited as providing a designated input, one or more embodiments also contemplate virtual input mechanisms and tools, such as provided through a touch-sensitive display. For example, any actionable data item may be selected, and inputs may be specified in connection with the data item through user-interaction that includes screen taps in locations where the data item is displayed in the active state.

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A method performed by one or more processors of a mobile computing device, the method comprising:
   receiving a record that is at least one member of a group consisting of an email, a text message, and an instant message;
   in response to receiving the record, automatically analyzing text in the record to identify a data item that contains a sequence of characters that is actionable to initiate communication with another device;
presenting the record on a contact-sensitive display of the mobile computing device while displaying the sequence of characters as a selectable link on the contact-sensitive display;
detecting a user touching the selectable link displayed on the contact-sensitive display; and
in response to detecting the user touching the selectable link, presenting, on the contact-sensitive display, a user-selectable menu including at least one option to add the identified data item to a corresponding contact of a contact record database stored on the mobile computing device.

2. The method of claim 1, wherein the identified data item is at least one member of the group consisting of a phone number, an email address, and a uniform resource locator (URL).

3. The method of claim 1, wherein the identified data item is an email address.

4. The method of claim 3, wherein the analyzing comprises detecting an "@" in the sequence of characters.

5. The method of claim 1, wherein the identified data item is a phone number.

6. The method of claim 5, wherein the analyzing comprises detecting a string of at least seven numbers or detecting a string of numbers that follows a set of three numbers in parenthesis.

7. The method of claim 1, wherein the identified data item is uniform resource locator (URL).

8. The method of claim 7, wherein the analyzing comprises detecting a ".com" in the sequence of characters.

9. The method of claim 7, wherein the analyzing comprises detecting a domain identifier.

10. The method of claim 1, wherein the identified data item is associated with a designated one of a number of types of communication.

11. The method of claim 10, wherein the designated type of communication is at least one member of the group consisting of an email, a text message, an instant message, a phone call, and videoconferencing.

12. The method of claim 1, further comprising:
detecting a user selection of the at least one option; and
in response to detecting the user selection of the at least one option, automatically adding the identified data item to the corresponding contact of the contact record database.

13. The method of claim 1, wherein detecting the user touching the selectable link includes detecting that the user has continuously touched the selectable link for a designated period of time.

14. The method of claim 1, further comprising:
automatically initiating communication with the other device based on a selection of the option.

15. The method of claim 1, wherein receiving the record comprises opening the at least one member of the group consisting of an email, a text message, and an instant message.

16. The method of claim 1, wherein the sequence of characters is automatically displayed as the selectable link on the contact-sensitive display.

17. The method of claim 1, wherein the selectable link containing the sequence of characters is displayed with a form of prominence on the contact-sensitive display.

18. A mobile computing device, comprising:
a contact-sensitive display;
one or more processors; and
a memory storing instructions that, when executed by the one or more processors, cause the mobile computing device to:
receive a record that is at least one member of a group consisting of an email, a text message, and an instant message;
in response to receiving the record, automatically analyze text in the record to identify a data item that contains a sequence of characters that is actionable to initiate communication with another device;
present the record on the contact-sensitive display while displaying the sequence of characters as a selectable link on the contact-sensitive display;
detect a user touching the selectable link displayed on the contact-sensitive display; and
in response to detecting the user touching the selectable link, present, on the contact-sensitive display, a user-selectable menu including at least one option to add the identified data item to a corresponding contact of a contact record database stored on the mobile computing device.

19. The mobile computing device of claim 18, wherein the identified data item is at least one member of the group consisting of a phone number, an email address, and a uniform resource locator (URL).

20. The mobile computing device of claim 18, wherein the identified data item is an email address, and execution of the instructions to automatically analyze the text in the record causes the mobile computing device to perform operations further comprising detecting an "@" in the sequence of characters.

21. The mobile computing device of claim 18, wherein the identified data item is a phone number, and execution of the instructions to automatically analyze the text in the record causes the mobile computing device to perform operations further comprising detecting a string of at least seven numbers or detecting a string of numbers that follows a set of three numbers in parenthesis.

22. The mobile computing device of claim 18, wherein the identified data item is a uniform resource locator (URL), and execution of the instructions to automatically analyze the text in the record causes the mobile computing device to perform operations further comprising detecting a ".com" in the sequence of characters.

23. The mobile computing device of claim 18, wherein the identified data item is associated with a designated one of a number of types of communication.

24. The mobile computing device of claim 23, wherein the designated type of communication is at least one member of the group consisting of an email, a text message, an instant message, a phone call, and videoconferencing.

25. The mobile computing device of claim 18, wherein execution of the instructions causes the mobile computing device to further:
detect a user selection of the at least one option; and
in response to detecting the user selection of the at least one option, automatically add the identified data item to the corresponding contact of the contact record database.

26. A non-transitory computer-readable medium storing instructions that, when executed by one or more processors of a mobile computing device including at least a contact-sensitive display, cause the mobile computing device to perform operations comprising:

receiving a record that is at least one member of a group consisting of an email, a text message, and an instant message;

in response to receiving the record, automatically analyzing text in the record to identify a data item that contains a sequence of characters that is actionable to initiate communication with another device;

presenting the record on a contact-sensitive display of the mobile computing device while displaying the sequence of characters as a selectable link on the contact-sensitive display;

detecting a user touching the selectable link displayed on the contact-sensitive display; and in response to detecting the user touching the selectable link, presenting, on the contact-sensitive display, a user-selectable menu including at least one option to add the identified data item to a corresponding contact of a contact record database stored on the mobile computing device.

27. The non-transitory computer-readable medium of claim 26, wherein the identified data item is at least one member of the group consisting of a phone number, an email address, and a uniform resource locator (URL).

28. The non-transitory computer-readable medium of claim 26, wherein the identified data item is an email address, and the analyzing comprises detecting an "@" in the sequence of characters.

29. The non-transitory computer-readable medium of claim 26, wherein the identified data item is a phone number, and the analyzing comprises detecting a string of at least seven numbers or detecting a string of numbers that follows a set of three numbers in parenthesis.

30. The non-transitory computer-readable medium of claim 26, wherein the identified data item is a uniform resource locator (URL), and the analyzing comprises detecting a ".com" in the sequence of characters.

31. The non-transitory computer-readable medium of claim 26, wherein the identified data item is associated with a designated one of a number of types of communication.

32. The non-transitory computer-readable medium of claim 31, wherein the designated type of communication is at least one member of the group consisting of an email, a text message, an instant message, a phone call, and videoconferencing.

33. The non-transitory computer-readable medium of claim 26, wherein execution of the instructions causes the mobile computing device to perform operations further comprising:

detecting a user selection of the at least one option; and in response to detecting the user selection of the at least one option, automatically adding the identified data item to the corresponding contact of the contact record database.

34. A mobile computing device, comprising:

means for receiving a record that is at least one member of a group consisting of an email, a text message, and an instant message;

means for automatically analyzing text in the record, in response to receiving the record, to identify a data item that contains a sequence of characters that is actionable to initiate communication with another device;

means for presenting the record on a contact-sensitive display of the mobile computing device while displaying the sequence of characters as a selectable link on the contact-sensitive display;

means for detecting a user touching the selectable link displayed on the contact-sensitive display; and means for presenting, in response to detecting the user touching the selectable link, a user-selectable menu on the contact-sensitive display, the user-selectable menu including at least one option to add the identified data item to a corresponding contact of a contact record database stored on the mobile computing device.

35. The mobile computing device of claim 34, wherein the identified data item is at least one member of the group consisting of a phone number, an email address, and a uniform resource locator (URL).

36. The mobile computing device of claim 34, wherein the identified data item is an email address, and the analyzing comprises detecting an "@" in the sequence of characters.

37. The mobile computing device of claim 34, wherein the identified data item is a phone number, and the analyzing comprises detecting a string of at least seven numbers or detecting a string of numbers that follows a set of three numbers in parenthesis.

38. The mobile computing device of claim 34, wherein the identified data item is a uniform resource locator (URL), and the analyzing comprises detecting a ".com" in the sequence of characters.

39. The mobile computing device of claim 34, wherein the identified data item is associated with a designated one of a number of types of communication.

40. The mobile computing device of claim 39, wherein the designated type of communication is at least one member of the group consisting of an email, a text message, an instant message, a phone call, and videoconferencing.

41. The mobile computing device of claim 34, further comprising:

means for detecting a user selection of the at least one option; and means for automatically adding the identified data item to the corresponding contact of the contact record database in response to detecting the user selection of the at least one option.

* * * * *